S. W. CLEMMENS.
Methods of Adjusting Circular-Saws.
No. 139,544.
Patented June 3, 1873.
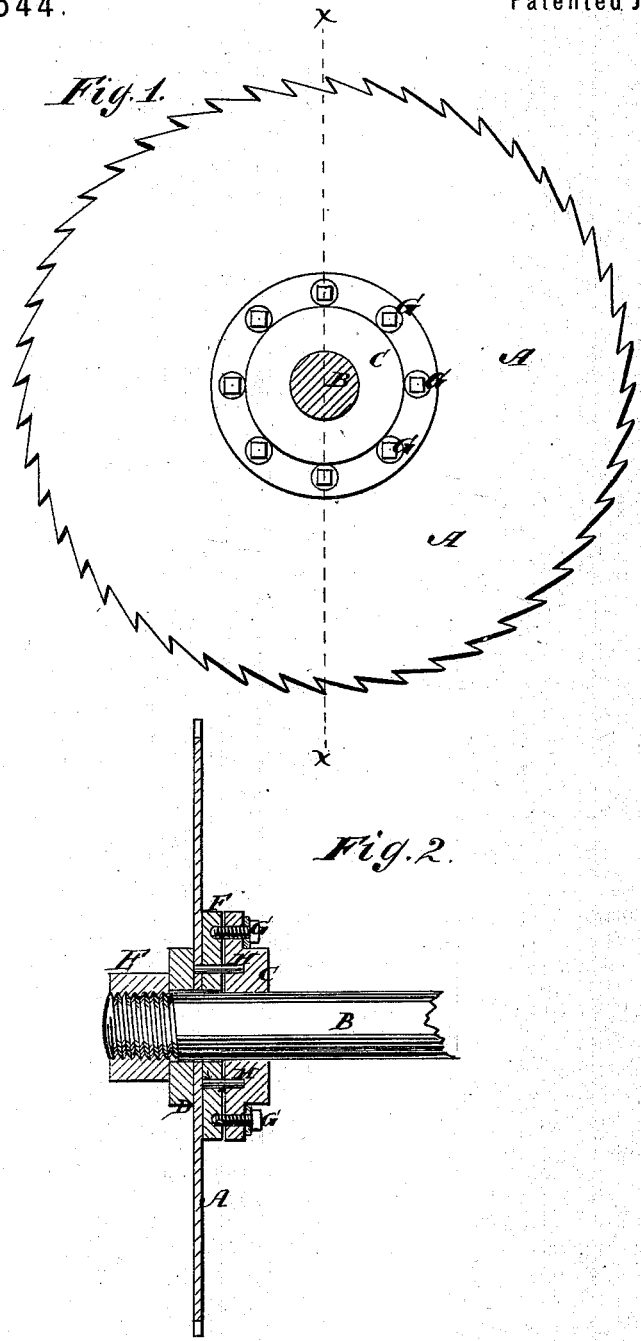

UNITED STATES PATENT OFFICE.

SANFORD W. CLEMMENS, OF CLEVELAND, OHIO.

IMPROVEMENT IN THE METHODS OF ADJUSTING CIRCULAR SAWS.

Specification forming part of Letters Patent No. 139,544, dated June 3, 1873; application filed March 22, 1873.

*To all whom it may concern:*

Be it known that I, SANFORD W. CLEMMENS, of Cleveland, in the county of Cuyahoga and State of Ohio, have invented a new Improvement in the Method of Adjusting Circular Saws, of which the following is a specification:

I propose to have a loose collar or disk between the saw and the fast collar, with adjusting-screws screwing through the fast collar against or into the loose collar to adjust the saw true in case the fast collar is not exactly true, which it often is not, or in case the saw itself is not ground true, which sometimes happens.

Figure 1 is a side elevation of the saw, and the fast collar, and section of the mandrel; and Fig. 2 is a section of Fig. 1 on the line $x\,x$.

Similar letters of reference indicate corresponding parts.

A is the saw; B, the mandrel; C, the fast collar; D, the ordinary detachable collar; and E the binding-nut. The fast collar, being turned up in the lathe when the mandrel runs on the lathe-centers, often does not run true when the mandrel runs in the boxes, because, owing to the springing of the mandrel when the journals are turned, or being a little loose on the centers, the journals and centers are not always true, consequently the saw will wabble. It also sometimes wabbles in consequence of being not quite true itself. The common way of remedying this is to pack thin pieces of paper between the saw and fast collar, but it is a tedious and at best an unsatisfactory way, and does not last long, and the packing is disarranged every time the saw is taken off.

I therefore propose to have a loose adjusting collar or disk, F, between the saw and collar C, with adjusting-screws G screwing through collar C against the side of collar F, or into sockets in it by which I can quickly and easily adjust the saw true. I prefer in this arrangement to have the dowel-pins H of the saw pass through this adjusting-collar into the fast collar; but this is not essential, particularly if the adjusting-screws enter sockets in the loose collar.

I am aware of the patent granted to F. H. Keeney, dated July 31, 1855, and desire to disclaim everything therein shown and described.

Having thus described my invention, I claim as new and desire to secure by Letters Patent—

The loose collar F, adjustable by a series of screws passing through a fixed collar, C, and the nut-binding device D E, combined with an end-threaded mandrel, B, as described, so that the saw may be made to work true, and prevented from wabbling, in the manner set forth.

SANFORD W. CLEMMENS.

Witnesses:
GEO. W. WILSON,
GEO. TOWNSEND.